(12) United States Patent
Wang et al.

(10) Patent No.: US 7,655,063 B2
(45) Date of Patent: Feb. 2, 2010

(54) CAN-FILTER STRUCTURE OF OXYGEN CONCENTRATOR

(75) Inventors: Shiow-Chen Wang, Taipei (TW); Wen-Feng Yang, Hsinchu County (TW); Wen-Ching Wu, Hsinchu (TW)

(73) Assignee: Treatyou Medical Technology Corporation, Thuebei (TW)

(*) Notice: Subject to any disclaimer, the term of this patent is extended or adjusted under 35 U.S.C. 154(b) by 237 days.

(21) Appl. No.: 11/984,774

(22) Filed: Nov. 21, 2007

(65) Prior Publication Data

US 2008/0302073 A1    Dec. 11, 2008

(30) Foreign Application Priority Data

Jun. 8, 2007    (TW) ................. 96120689 A

(51) Int. Cl.
*B01D 39/00*    (2006.01)
(52) U.S. Cl. .............. 55/490; 55/507; 128/200.24; 96/133
(58) Field of Classification Search .......... 55/490, 55/507; 128/200.24; 96/133
See application file for complete search history.

(56) References Cited

U.S. PATENT DOCUMENTS

| | | | | |
|---|---|---|---|---|
| 2,301,474 | A * | 11/1942 | Sullins | 429/79 |
| 3,513,817 | A * | 5/1970 | Kearsley | 123/552 |
| 5,308,369 | A * | 5/1994 | Morton et al. | 55/379 |
| 6,044,842 | A * | 4/2000 | Pereira et al. | 128/202.27 |
| 6,139,609 | A * | 10/2000 | Eimer et al. | 96/117.5 |
| 6,833,023 | B1* | 12/2004 | Vandenberghe et al. | 95/268 |
| 2006/0096597 | A1* | 5/2006 | Amann | 128/205.27 |
| 2008/0185544 | A1* | 8/2008 | Yeh | 251/129.06 |

* cited by examiner

*Primary Examiner*—Robert J Hill, Jr.
*Assistant Examiner*—Christopher P Jones
(74) *Attorney, Agent, or Firm*—Birch, Stewart, Kolasch & Birch, LLP

(57) ABSTRACT

The invention is a can-filter structure of an oxygen concentrator, which includes: a first can-filter having filter material; a second can-filter having filter material; and an outlet cover. The first can-filter includes an air inlet provided at the entrance side of the first can-filter and a first conical joint formed at the exit side of the first can-filter, wherein the first conical joint is hollow and at least one recess is provided on the outer surface thereof. The second can-filter includes a second conical joint formed at the entrance side of the second can-filter, wherein the second conical joint is hollow, and at least one engaging hook corresponding to the recess is provided on the inner surface thereof for coupling to the first conical joint. The outlet cover is provided at the exit side of the second can-filter and is coupled thereto by ultrasonic fusion.

16 Claims, 4 Drawing Sheets

CAN-FILTER STRUCTURE OF OXYGEN CONCENTRATOR

BACKGROUND OF THE INVENTION a) Field of the Invention

The invention relates to a can-filter structure of oxygen concentrator and, more particularly, to a can-filter structure of household or personal PSA oxygen concentrator.

b) Description of the Related Art

An oxygen concentrator provides oxygen at substantially higher concentrations than those of ambient air. The oxygen concentration in general ambient air is around 20%, but it would help a person to recover from tiredness and release pressure after high-intensity exercises if the oxygen concentration is raised to about 30% to 35%. Moreover, patients with respiratory problems like asthma need highly concentrated oxygen for medical and heath care purposes.

Common methods used to supply oxygen include: 1) pressure swing adsorption (PSA), 2) electrolysis, and 3) usage of oxygen tank. The PSA method is to obtain oxygen from ambient air, wherein through the work of a molecular sieve in the oxygen concentrator, nitrogen in the ambient air is absorbed, and thus the effect of continuously obtaining oxygen from air is achieved. The electrolysis method is to generate oxygen and hydrogen by liquid water electrolysis, and the oxygen is extracted for use. The oxygen tank is a steel cylinder, in which oxygen is stored in liquid state and under high pressure, and oxygen is released from the tank when it is needed.

In terms of the PSA oxygen concentrator, since the can-filter and molecular sieve are used to carry out oxygen generation, they are required to be replaced periodically. However, due to the complexity of the internal assembly, most of the replacement and disassembling operations are performed by professional technicians, which is very inconvenient to the users. Moreover, most of the oxygen concentrators are bulky in size and are unsuitable for use in automobiles or as portable devices.

According to prior art, in a PSA oxygen concentrator, two can-filters to be coupled are provided with inner threaded portion and outer threaded portion, respectively, at the corresponding connection portions thereof, and sealing tapes are attached to the threaded portions. Then, two can-filters are coupled by screwing together their corresponding threaded portions with sealing tapes being sandwiched therebetween. This operation process is complicated and results in poor air tightness, which is prone to air leakage.

In addition, conventionally, the outlet of the second can-filter in PSA oxygen generators is a straight round pipe, but such design would cause a hose, which is used to connect between the pipe and other devices, to deform at turns. The deformation of hose would block airflow, making the air to flow not as smoothly or the local pressure to be high, and in turn causes air leakage or damages to the elements. Furthermore, the hose used for connection has to be detached when replacing can-filters, thus it is very inconvenient to use.

For household or personal oxygen concentrators, safety, convenience, and reasonable pricing are important considerations. The invention is a design that made a structural improvement to PSA oxygen generators, making them more compact, lightweight, and easier to assemble and replace consumables/materials. In other words, the invention has a competitive price and is more suitable for household or personal use.

BRIEF SUMMARY OF THE INVENTION

An object of the invention is to provide a can-filter structure of oxygen concentrator, which has an improved design to cure the aforementioned defects of the oxygen concentrator, and the can-filter structure is compact, lightweight, easily detachable, and has good air tightness.

The invention includes: a first can-filter with filter material provided therein for filtering air passing through; a second can-filter with filter material provided therein for filtering air from the first can-filter; and an outlet cover with a 90 degrees bend provided thereto.

The first can-filter includes: a hollow first filter can having an entrance side and an exit side, which has an air inlet at the entrance side; a lid disposed at the air inlet, which has a wing-shaped grip provided at the center on the one side of the lid opposite the air inlet for detaching the first can-filter; and a hollow first conical joint provided at the exit side of the first filter can. The narrow end of the first conical joint is coupled to a first tubular portion, and at where the two are coupled, an annular groove is provided with an airtight sealing ring inserted therein.

The second can-filter includes a second hollow second filter can, which has an entrance side and an exit side, and a hollow second conical joint provided at the entrance side of the second filter can, wherein a second tubular portion is integrally formed between the narrow end of the second conical joint and the entrance side of the second filter can. When the first can-filter and the second can-filter are connected, the second tubular portion is mounted around the periphery of the first tubular portion, and the aforementioned airtight sealing ring is disposed between the two tubular portions to create an airtight effect. Moreover, the outlet cover with a 90 degrees bend is provided at the exit side of the second filter can and is coupled to the second filter can by ultrasonic fusion.

Furthermore, the first conical joint of the first can-filter and the second conical joint of the second can-filter are respectively provided with, on their surfaces, a double-recess structure and a double-engagement hook structure that correspond to one another and the recesses/resilient engaging hooks are arranged at equally spaced positions in the circumferential direction for engaging with one another. The engagement detachably fastens the first conical joint and the second conical joint, making the assembly of the first can-filter and the second filter more secure and easier to disassemble. The elements of the invention are formed and coupled by ultrasonic fusion, thus excellent fixity is achieved.

The first can-filter and the second can-filter of the invention are assembled together by: 1) first ensuring a second can-filter is securely fixed in place; 2) closing the lid on a first can-filter to cover/close an air inlet; 3) inserting the first conical joint of the first can-filter into the second conical joint of the second can-filter; and 4) rotating the first can-filter clockwise by at most 180 degrees by using the wing-shaped grip on the one side of the lid opposite the air inlet of the first can-filter. The rotation causes the double-recess structure on the surface of the first conical joint to form an engagement with the double-engagement hook structure on the surface of the second conical joint, and the assembly is complete once they are engaged. Similarly, to disassemble the assembled first and second can-filter structure, the lid on the first can-filter is firstly closed to cover/close the air inlet, and then the first can-filter is rotated clockwise by 30 to 90 degrees by using the wing-shaped grip on the one side of the lid opposite the air inlet. The rotation causes the double-recess structure on the surface on the first conical joint to slide off the double-engagement hook structure on the surface of the second conical joint, and therefore the first conical joint disengages from the second conical joint. Thus, the first can-filter can be replaced.

DETAILED DESCRIPTION OF THE INVENTION

Figure 1:
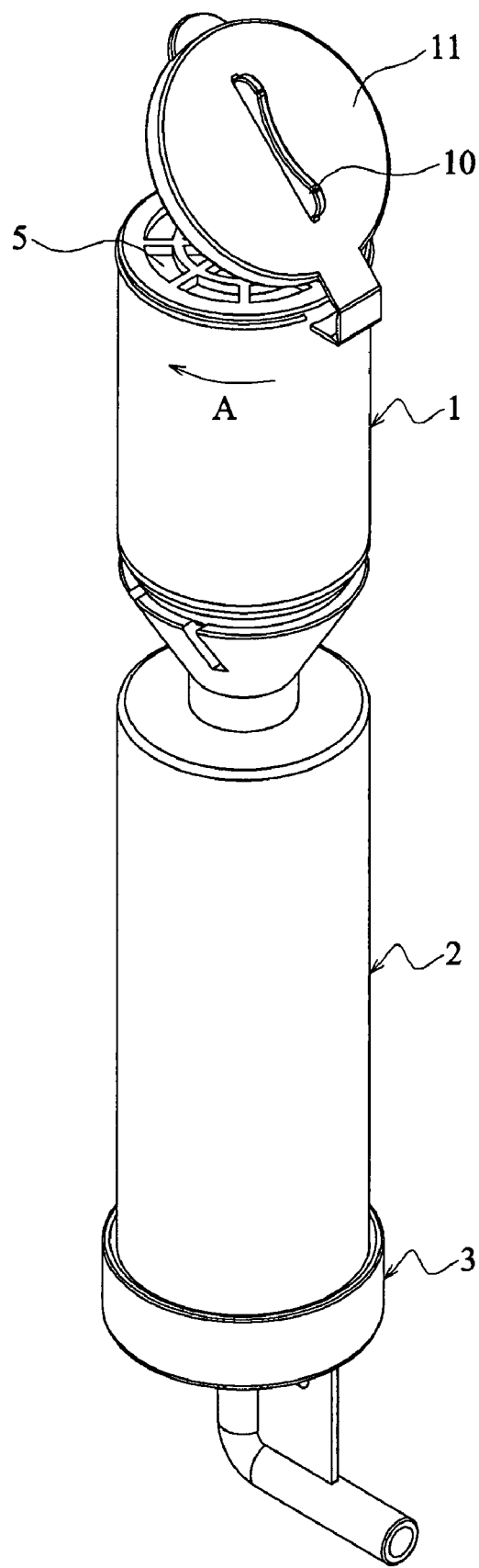
FIG. 1 is a pictorial view of an assembled can-filter structure according to an embodiment of the invention.

The can-filter structure according to preferred embodiments of the invention will be described in detail with reference to the drawings, in which like reference numerals denote like elements.

FIG. 1 is a pictorial view of a can-filter structure according to an embodiment of the invention. The can-filter structure includes: a first can-filter 1 with an entrance side and an exit side, a second can-filter 2 with an entrance side and an exit side, and an outlet cover 3. The first can-filter 1 includes an air inlet 5 provided at the entrance side and a lid 11 disposed at the air inlet 5 so as to open and close the air inlet 5; a wing-shaped grip 10 is disposed on the one side of the lid 11 opposite the air inlet 5. The exit side of the first can-filter 1 is connected to the entrance side of the second can-filter 2, and the exit side of the second can-filter 2 is overlaid with the outlet cover 3. The first can-filter 1 and the second can-filter 2 are hollow structures filled therein with filter materials to filter impurities, vapor, and dust in air for air purification. Air filtered thereby can be provided to devices like molecular sieves for air separation.

Figure 2A:
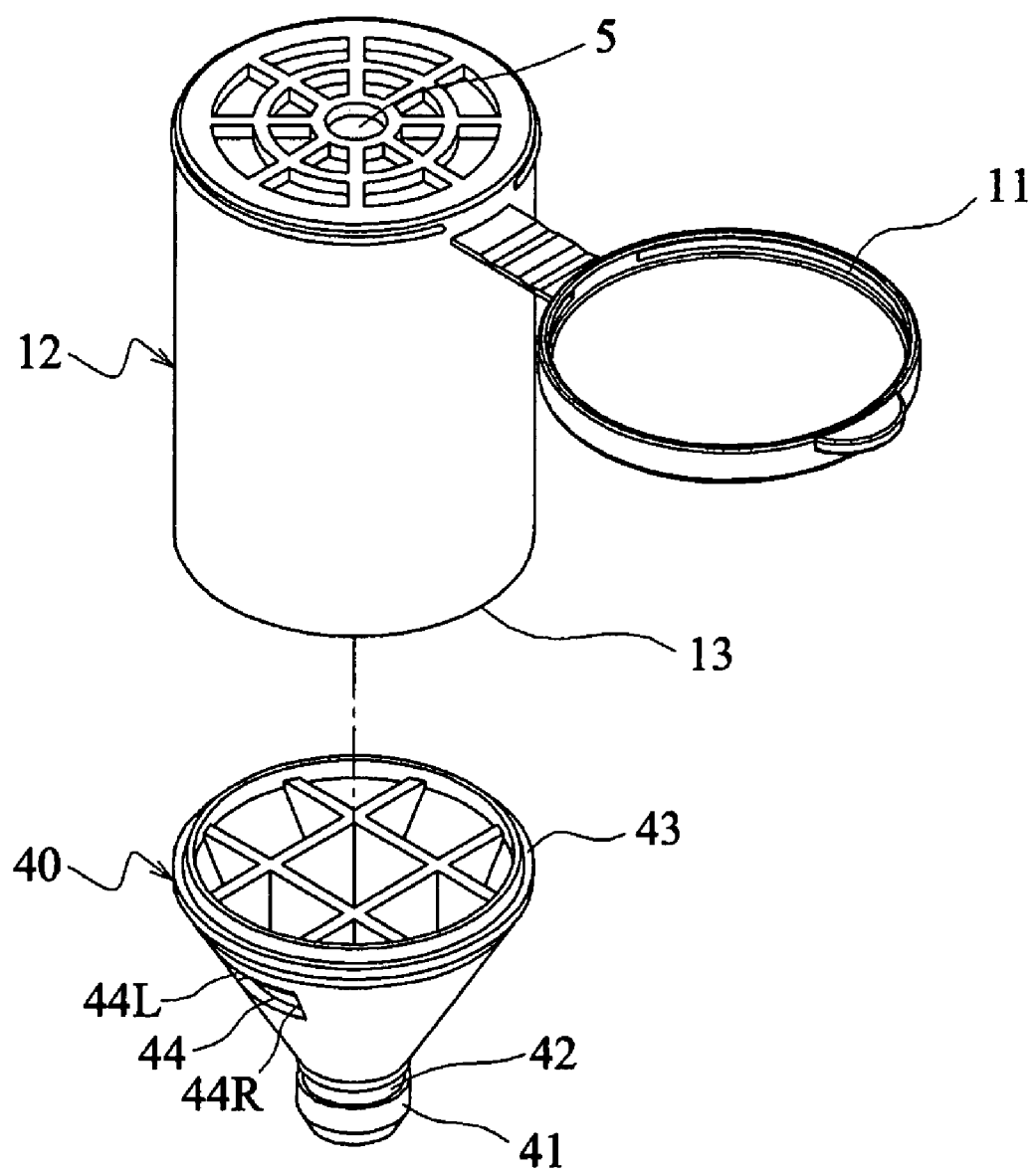
FIG. 2A is an exploded pictorial view of a first can-filter according to the same embodiment of the invention.

As shown in FIG. 2A, the first can-filter 1 includes a first filter can 12 that is hollow and of a cylindrical shape and, a first conical joint 40 that is hollow and coupled to the first filter can 12. The first filter can 12 has an entrance side and an exit side and is provided with the air inlet 5 at its entrance side and a junction 13 at its exit side. The air inlet 5 can be covered/closed by the lid 11 disposed thereon that has the wing-shaped grip 10, as shown in FIG. 1, for easy disassembly and assembly of the first can-filter 1, which will be described later. Referring back to FIG. 2A, the first conical joint 40 and the first filter can 12 are securely coupled together by sealing the seam between a junction 43 of the wide end of the first conical joint 40 and the junction 13 of the exit side of the first filter can 12. The seam is sealed by ultrasonic fusion to increase air tightness. The narrow end of the first conical joint 41 is integrally connected to a first tubular portion 41, wherein an annular groove 42 is provided at the periphery of the connecting part, and an airtight sealing ring (not illustrated) is inserted into the annular groove 42 to increase the air tightness for connection to the second can-filter 2.

Figure 2B:
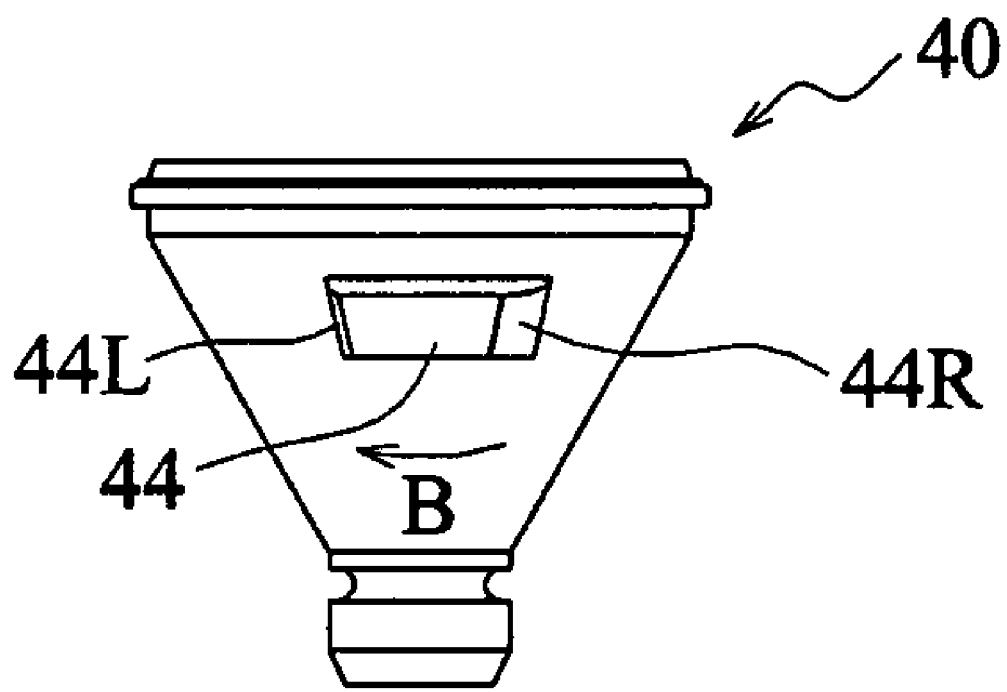
FIG. 2B is a side view of a first conical joint according to the same embodiment of the invention.

A double-recess structure 44, composed of two recesses (FIGS. 2A and 2B each illustrate one of the two recesses) that are arranged at equally spaced positions in the circumferential direction and on the outer surface of the first conical joint 40, is used for securely coupling to the second can-filter 2. Each recess of the double-recess structure 44 is provided on the outer surface of the first conical joint 40 and extended along the circumferential direction, like that indicated by arrow B in FIG. 2B. The recess forms an engagement with the insertion of a resilient engaging hook of a double-engagement hook structure 24, which will be described later. The left end face 44L of the recess is a vertical plane that is perpendicular to the recess bottom, for keeping the resilient engaging hook of the double-engagement hook structure 24 in place. The right end face 44R of the recess is an inclined plane that declines towards the recess bottom in the direction pointed by arrow B, for allowing the resilient engaging hook of the double-engagement hook structure 24 to slide along the inclined plane and out of the recess.

Figure 3:
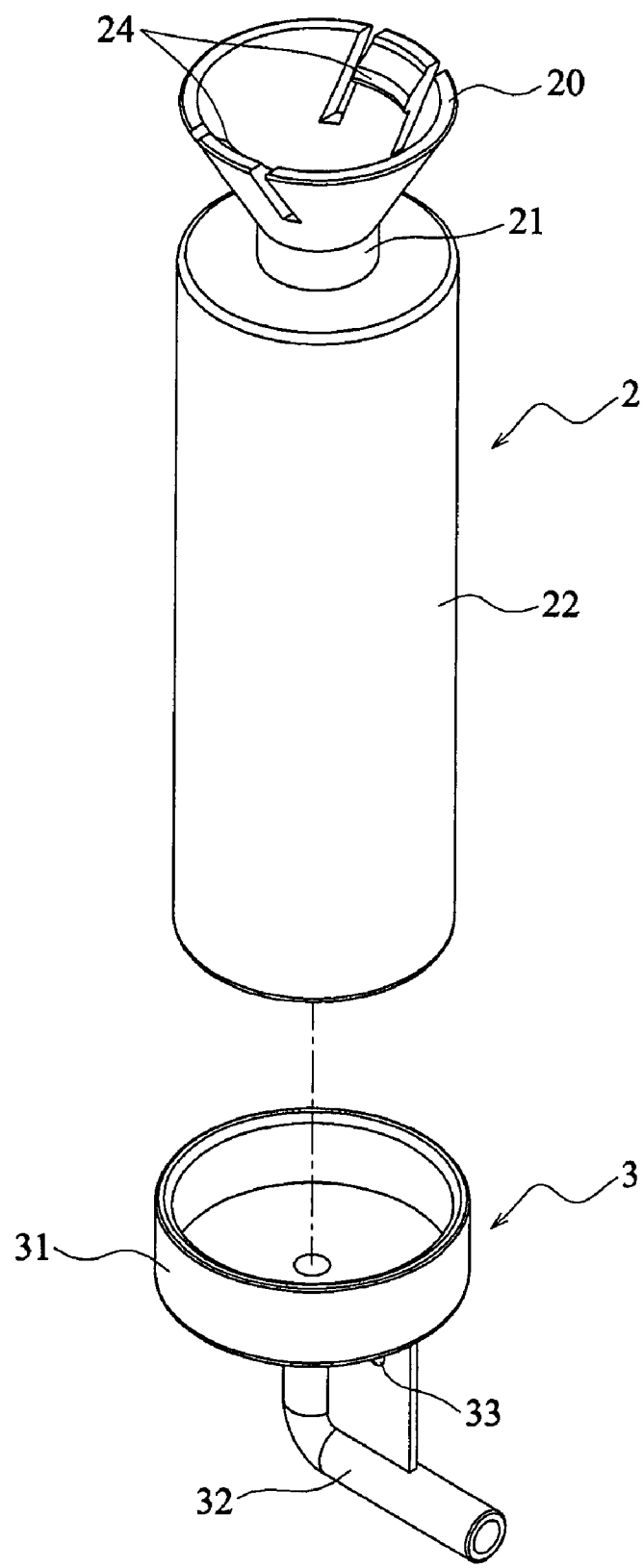
FIG. 3 is an exploded pictorial view of a second can-filter and an outlet cover according to the same embodiment of the invention.

FIG. 3 is an exploded pictorial view of a second can-filter and an outlet cover according to the same embodiment of the invention. The second can-filter 2 is hollow and is provided with filter material therein to filter air from the first can-filter 1. The second can-filter 2 includes a second filter can 22 that is hollow and of a cylindrical shape and has an entrance side and an exit side and, a second conical joint 20 that is hollow and provided at the entrance side of the second filter can 22. The exit side of the second filter can 22 is overlaid with the outlet cover 3.

Referring to FIG. 3, a second tubular portion 21 is integrally formed between the entrance side of the second filter can 22 and the narrow end of the second conical joint 20 for connecting the two. In the state where the first can-filter 1 and the second can-filter 2 are coupled together, the second tubular portion 21 is mounted around the periphery of the first tubular portion 41, and the aforementioned airtight sealing ring is disposed between the two tubular portions to create an airtight effect.

Moreover, the second conical joint 20 is provided with, on its inner surface, the double-engagement hook structure 24 that corresponds to the double-recess structure 44 formed on the first conical joint 40. The double-engagement hook structure 24 is composed of two radial elastic/resilient engaging hooks arranged at equally spaced positions in the circumferential direction. When assembling the first can-filter 1 and the second can-filter 2, the first conical joint 40 of the first can-filter 1 is mounted to the inside of the second conical joint 20. The assembly requires the first conical joint 40, with respect to the second conical joint 20, to be pressed and rotated in the direction pointed by arrow A in FIG. 1 to a position where the double-engagement hook structure 24 slips/snaps into the double-recess structure 44. Thus, an engagement is formed, detachably fastening the first conical joint 40 and the second conical joint 20.

Conventionally, the coupling between the first can-filter and the second can-filter is more complex and has poor air tightness, whereby air may leak easily. Thus, the invention provides a simplified assembling process by using the aforementioned engagement structure composed of double-recesses and elastic/resilient double-engaging hooks, and by coupling with the airtight sealing ring at the connecting part of the first and the second tubular portions, while obtaining better air tightness. In addition, the fixity and the air tightness are more superior because each element according to the embodiment of the invention is coupled by ultrasonic fusion.

As shown in FIG. 3, the outlet cover 3 is an integrally formed element including: a cover 31 and a 90 degrees bend 32. The outlet cover 3 covers the exit side of the second can-filter 2, wherein the two are coupled by ultrasonic fusion to prevent air leakage. Moreover, a thin plate having a mounting hole 33 is attached to the bend 32 and the cover 31, for securing the entire can-filter structure to a mounting with fasteners like screws. Air filtration is complete when air filtered by the first can-filter 1 and the second can-filter 2 passes through the 90 degrees bend 32 and flows out of the can-filter structure. The filtered air can be further delivered to a molecular sieve for air separation. In the structure of an oxygen concentrator, the bend structure of the 90 degrees bend 32 can be used with other elements to eliminate tubing work, so the disassembly/assembly of the can-filter structure is more convenient and the air tightness at tubing connections is improved.

According to the conventional technology, the outlet of second can-filter is a straight pipe that needs to be connected to other devices by hose and wire. However, hose, when installed improperly for connecting to other devices, would have twirls and/or be slightly folded that blocks airflow therein, and in turn the air flows uneasy or local pressure increases, causing air leakage or damages to elements. In addition, the connecting part between the straight pipe and the hose is prone to air leakage. Problems similar to these mentioned above are avoided in the invention by using the 90 degrees bend design, and in combination with other devices of the invention, fast disassembling/assembling and superior air tightness are featured functions that can be achieved.

Referring again to FIG. 1, the lid 11 is usually open when the oxygen concentrator is in use. Air first enters the air inlet 5 and into the first can-filter 1 where the first filtration of impurities, vapor, and dust takes place. Thereafter, air passes through the first conical joint 40 and the second conical joint 20 coupled to the first conical joint 40, and enters the second can-filter 2 for a second filtration. Finally, air leaves the second can-filter through the 90 degrees bend 32 of the outlet cover 3, completing the filtration process.

A characteristic of the can-filter structure of the invention is that consumers themselves can easily change the can-filters. The first can-filter and the second can-filter are used to filter impurities and vapor in air and so would have different service life depending on air condition. On average, the first can-filter needs to be changed every three months and the second can-filter is changed once a year. One may find that the frequency of changing the first can-filter is quite high, and therefore it is important to make this task convenient and fast for consumers. Hence, the invention is designed to include a structure that allows the consumers themselves to quickly change the can-filters. The disassembling/assembling process according to an embodiment of the invention is described.

The first can-filter 1, after being in use for a time period, needs to be changed in a condition where it is coupled to the affixed second can-filter 2. Referring to FIG. 1, if the first can-filter 1 is to be detached therefrom, the lid 11 is closed on the air inlet 5, and the can-filter 1 is rotated clockwise relative to the can-filter 2 by 30 to 90 degrees by using the wing-shaped grip 10 on the lid 11. Through the rotation, the double-recess structure 44 on the outer surface of the first conical joint 40 slides off and out of the double-engagement hook structure 24 on the inner surface of the second conical joint 20. Thus the first can-filter 1 disengages from the second can-filter 2 and can be taken out for replacement.

Similarly, to assemble the new first can-filter 1 to the second can-filter 2, the first conical joint 40 of the first can-filter 1 is first inserted into the second conical joint 20 of the second can-filter 2. Then, the first can-filter 1 is rotated clockwise, relative to the second can-filter 2, by at most 180 degrees by using the wing-shaped grip 10 on the lid 11 of the first can-filter 1, whereby the double-recess structure 44 on the outer surface of the first conical joint 40 and the double-engagement hook structure 22 on the inner surface of the second conical joint 20 form an engagement. The engagement detachably fastens the first conical joint 40 and the second conical joint 20 together, and the assembly is complete.

Moreover, with the design of the aforementioned inclined plane 44R and vertical plane 44L in each recess of the double-recess structure 44, the first can-filter 1 of the invention is easily detached when rotated in the clockwise direction but hard to disengage from the second can-filter 2 when rotated in the counterclockwise direction. Hence, the easiness for replacement and fixity of the device are enhanced.

Another embodiment of the invention is similar to one of the aforementioned embodiments, wherein the difference is the placement of the recess and the engaging hook. In this embodiment, each engaging hook in the double-engagement hook structure is arranged at equally spaced positions in the circumferential direction on the outer surface of the first conical joint of the first can-filter, whereas each recess in the double-recess structure corresponding to the aforementioned double-engagement hook structure is arranged at corresponding positions in the circumferential direction on the inner surface of the second conical joint of the second can-filter.

Yet another embodiment of the invention is similar to one of the aforementioned embodiments, but with the recess structure on the outer surface of the first conical joint of the first can-filter being one recess or, a plurality of recesses arranged at equally spaced, or unequally spaced, positions in the circumferential direction, or being any combination thereof. As such, the inner surface of the second conical joint of the second can-filter is provided with, in corresponding to the recess structure on the outer surface of the first conical joint, one engaging hook or, a plurality of engaging hooks arranged at corresponding positions in the circumferential direction, or with any combination thereof.

According to yet another embodiment of the invention, which is similar to one of the aforementioned embodiments, the first can-filter and the second can-filter can be cylinder shaped, polygonal column shaped, or any combination thereof.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretations so as to encompass all such modifications and similar arrangements.

What is claimed is:

1. A can-filter structure of oxygen concentrator, comprising: a first can-filter, which comprises: a hollow first filter can, filled therein with filter material for filtering air passing therethrough, and having an entrance side and an exit side; an air inlet provided at the entrance side of the first filter can; a hollow first conical joint formed at the exit side of the first filter can; at least one recess provided on the outer surface of the first conical joint; a first tubular portion integrally formed at the narrow end of the first conical joint; and an airtight sealing ring provided around the periphery of the first tubular portion; a second can-filter, which comprises: a hollow second filter can, filled therein with filter material for filtering air from the first can-filter, and having an entrance side and an exit side; a hollow second conical joint formed at the entrance side of the second filter can, for coupling over the outer surface of the first conical joint; at least one resilient engaging hook provided on the inner surface of the second conical joint and corresponding to the at least one recess; and a second tubular portion connecting the entrance side of the second filter can and the narrow end of the second conical joint; and an outlet cover provided at the exit side of the second filter can and coupled to the second filter can by ultrasonic fusion; wherein the first conical joint and the second conical joint may be rotated relative to each other to a position where the at least one resilient engaging hook snaps into the at least one recess so as to form an engagement that detachably fastens the first conical joint and the second conical joint; wherein as the first can-filter and the second can-filter are coupled, the second tubular portion is mounted around the periphery of the first tubular portion, and the airtight sealing ring is disposed between the two tubular portions to provide an airtight effect.

2. The can-filter structure as described in claim 1, wherein a lid is disposed at the air inlet of the first filter can so as to open/close the air inlet, and a wing-shaped grip is provided on the one side of the lid opposite the air inlet for rotating and manipulating the first filter can in a state when the air inlet is closed.

3. The can-filter structure as described in claim 1, wherein the outlet cover comprises a bend structure that is integrally formed therewith.

4. The can-filter structure as described in claim 3, wherein a thin plate is provided near the bend structure, and the thin plate has a mounting hole for securing the can-filter structure to a mounting.

5. The can-filter structure as described in claim 1, wherein the at least one recess and the at least one resilient engaging hook each corresponds to one another.

6. The can-filter structure as described in claim 5, wherein when there is more than one recess, the recesses are arranged at equally spaced positions in the circumferential direction of the first conical joint.

7. The can-filter structure as described in claim 5, wherein when there is more than one resilient engaging hook, the resilient engaging hooks are arranged at corresponding positions in the circumferential direction of the second conical joint.

8. The can-filter structure as described in claim 1, wherein the at least one recess is of a double-recess structure and the at least one resilient engaging hook is of a double-engagement hook structure.

9. A can-filter structure of oxygen concentrator, comprising: a first can-filter, which comprises: a hollow first filter can, filled therein with filter material for filtering air passing therethrough, and having an entrance side and an exit side; an air inlet provided at the entrance side of the first filter can; a hollow first conical joint formed at the exit side of the first filter can; at least one resilient engaging hook provided on the outer surface of the first conical joint; a first tubular portion integrally formed at the narrow end of the first conical joint; and an airtight sealing ring provided around the periphery of the first tubular portion; a second can-filter, which comprises: a hollow second filter can, filled therein with filter material for filtering air from the first can-filter, and having an entrance side and an exit side; a hollow second conical joint formed at the entrance side of the second filter can, for coupling over the outer surface of the first conical joint of the first can-filter; at least one recess provided on the inner surface of the second conical joint and corresponding to the at least one resilient engaging hook; and a second tubular portion con connecting the entrance side of the second filter can and the narrow end of the second conical joint; and an outlet cover provided at the exit side of the second filter can and coupled to the second filter can by ultrasonic fusion; wherein the first conical joint and the second conical joint may be rotated relative to each other to a position where the at least one resilient engaging hook snaps into the at least one recess to form an engagement that detachably fastens the first conical joint and the second conical joint; wherein as the first can-filter and the second can-filter are coupled, the second tubular portion is mounted around the periphery of the first tubular portion, and the airtight sealing ring is disposed between the two tubular portions to provide an airtight effect.

10. The can-filter structure as described in claim 9, wherein a lid is disposed at the air inlet of the first filter can so as to open/close the air inlet, and a wing-shaped grip is provided on the one side of the lid opposite the air inlet for rotating and manipulating the first filter can in a state when the air inlet is closed.

11. The can-filter structure as described in claim 9, wherein the outlet cover comprises a bend structure that is integrally formed therewith.

12. The can-filter structure as described in claim 11, wherein a thin plate is provided near the bend structure, and the thin plate has a mounting hole for securing the can-filter structure to a mounting.

13. The can-filter structure as described in claim 9, wherein the at least one resilient engaging hook and the at least one recess each corresponds to one another.

14. The can-filter structure as described in claim 13, wherein when there is more than one resilient engaging hook, the resilient engaging hooks are arranged at equally spaced positions in the circumferential direction of the first conical joint.

15. The can-filter structure as described in claim 13, wherein when there is more than one recess, the recesses are arranged at corresponding positions in the circumferential direction of the second conical joint.

16. The can-filter structure as described in claim 9, wherein the at least one resilient engaging hook is of a double-engagement hook structure and the at least one recess is of a double-recess structure.

* * * * *